(12) United States Patent  
Li et al.

(10) Patent No.: US 9,111,128 B2  
(45) Date of Patent: Aug. 18, 2015

(54) THREE-DIMENSIONAL DATA PROCESSING AND RECOGNIZING METHOD

(71) Applicants: NUCTECH COMPANY LIMITED, Beijing (CN); TSINGHUA UNIVERSITY, Beijing (CN)

(72) Inventors: Mingliang Li, Beijing (CN); Zhiqiang Chen, Beijing (CN); Yuanjing Li, Beijing (CN); Li Zhang, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 69 days.

(21) Appl. No.: 14/136,426

(22) Filed: Dec. 20, 2013

(65) Prior Publication Data

US 2014/0185874 A1    Jul. 3, 2014

(30) Foreign Application Priority Data

Dec. 27, 2012    (CN) .......................... 2012 1 0581559

(51) Int. Cl.  
*G06K 9/00*    (2006.01)

(52) U.S. Cl.  
CPC ........ *G06K 9/00201* (2013.01); *G06K 9/00771* (2013.01); *G06K 2209/09* (2013.01)

(58) Field of Classification Search  
CPC combination set(s) only.  
See application file for complete search history.

(56) References Cited

U.S. PATENT DOCUMENTS

| | | | | | |
|---|---|---|---|---|---|
| 4,687,933 | A | * | 8/1987 | Loy | 250/334 |
| 5,006,299 | A | * | 4/1991 | Gozani et al. | 376/159 |
| 5,114,662 | A | * | 5/1992 | Gozani et al. | 376/159 |
| 5,598,453 | A | * | 1/1997 | Baba et al. | 378/146 |
| 6,148,095 | A | * | 11/2000 | Prause et al. | 382/131 |
| 6,539,330 | B2 | * | 3/2003 | Wakashiro | 702/152 |
| 7,347,622 | B2 | * | 3/2008 | Sadakane et al. | 378/197 |
| 7,362,847 | B2 | * | 4/2008 | Bijjani | 378/57 |
| 8,791,957 | B2 | * | 7/2014 | Kadomura et al. | 345/619 |
| 2002/0029127 | A1 | * | 3/2002 | Wakashiro | 702/152 |
| 2007/0041491 | A1 | * | 2/2007 | Sadakane et al. | 378/15 |
| 2007/0133744 | A1 | * | 6/2007 | Bijjani | 378/57 |
| 2014/0185873 | A1 | | 7/2014 | Li | |
| 2014/0185923 | A1 | | 7/2014 | Chen | |

* cited by examiner

*Primary Examiner* — Anand Bhatnagar  
(74) *Attorney, Agent, or Firm* — Pillsbury Winthrop Shaw Pittman LLP

(57) ABSTRACT

A three-dimensional data processing and recognizing method including scanning and re-constructing objects to be detected so as to obtain three-dimensional data for recognition of the objects to be detected; extracting data matching to features from the three-dimensional data, so that the extracted data constitutes an interested target; with respect to the data matching to features, merging and classifying adjacent data points as one group, to form an image of the merged interested target; recognizing a cross section of the interested target; cutting the interested targets by a perpendicular plane which passes through a central point of the cross section and is perpendicular to it, in order to obtain a graph; and recognizing shape of the interested targets based on a property of the graph.

15 Claims, 5 Drawing Sheets

THREE-DIMENSIONAL DATA PROCESSING AND RECOGNIZING METHOD

This application claims priority to Chinese Patent Application No. 201210581559.9 filed on Dec. 27, 2012, the disclosure of which is incorporated herein in its entirety by reference.

FIELD

The present invention relates to three-dimensional data processing and recognizing, and more particularly, to intelligent recognition of prohibited articles in security inspection apparatuses by CT or to be detected articles in nuclear magnetic resonance systems.

BACKGROUND

The civil aviation transportation industry has become a primary target of terroristic activities, since it has characteristics such as a large number of passengers, susceptibility to easy attack and a large effect afterwards.

After the terrorist attacks occurred on Sep. 11, 2001, the U.S. government put additional aviation safety inspections into practice, which demand inspection for explosives of all selected baggage. Known explosive detection systems obtain images of the contents in packages by X-ray (radioscopy) or CT techniques. The U.S. government regulates that all selected baggage must be inspected with respect to explosives by techniques certified by the Transportation Security Agency (TSA), starting from December of 2001. So far, the only one which has been certified by the TSA is CT technology.

Currently, the majority of security inspection CT machines all can obtain three-dimensional CT data. Since passenger flow volume at airport is very large, explosive detection systems for consigned and hand baggage require a high throughput. There is an urgent need for a solution to intelligently recognize prohibited articles, which can reduce working intensity, decrease anthropogenic factors and increase the throughput.

SUMMARY

In view of this, there is indeed a need for a new three-dimensional data processing and recognizing method used in security inspection CT machines.

In view of this, an object of the present invention is to alleviate at least one aspect of the above problems and defects in the prior art.

According to one aspect of the present invention, there is provided a new three-dimensional data processing and recognizing method, comprising:

scanning and re-constructing objects to be detected so as to obtain three-dimensional data for recognition of the objects to be detected;

extracting data matching to features from the three-dimensional data, so that the extracted three-dimensional data constitutes interested targets;

with respect to the data matching to features, adjacent data points are merged and classified as one group, to form an image of the merged interested targets;

recognizing a cross section of the interested targets;

cutting the interested targets by at least one perpendicular plane which passes through a central point of the cross section and is perpendicular to it, in order to obtain a graph; and recognizing shapes of the interested targets based on property of the graph.

The general concept is that the three-dimensional data obtained by scanning and re-constructing of the security inspection CT system is searched, extracted, merged, counted and recognized in terms of shapes, by feature data of the suspect object or the interested targets, for example, dangerous articles or prohibited articles. As image segmentation of the three-dimensional data in the prior art is still relatively difficult up to now, and accuracy and generality thereof are not so good, starting from another viewpoint an embodiment of the present invention provides the present three-dimensional data processing and recognizing method which solves a problem of searching, preparing statistics and recognizing in terms of shape for the interested targets.

BRIEF DESCRIPTION OF THE DRAWINGS

These and other aspects as well as advantages of the present invention will become apparent and readily understood from the description of the preferred embodiments taking in conjunction with the accompanying drawings, in which.

DETAILED DESCRIPTION OF THE EMBODIMENTS

Figure 1:
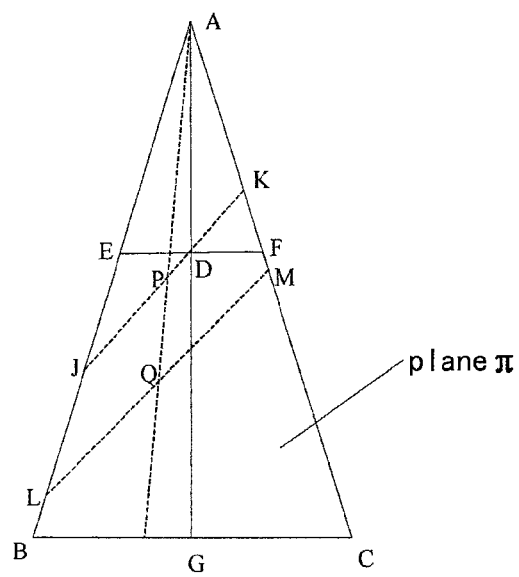
FIG. 1 is a schematic view of cone.
Figure 2:
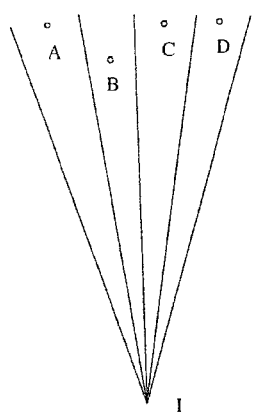
FIG. 2 is a schematic view showing elimination of some data points absent in a surface.

Technical solutions will be described hereinafter in more detail by the way of embodiment with reference to FIGS. 1-5 of the attached drawings, wherein the same or like reference numerals refer to the same or like elements throughout the specification. The explanation of an embodiment of the present invention in reference to the accompanying drawings is intended to interpret the general inventive concept of the present invention, rather than being construed as a limiting the present invention.

Taking CT image data obtained by scanning and re-constructing of a security inspection CT system as an example, an embodiment of the present invention explains how to recognize one or more prohibited articles or dangerous articles by a three-dimensional data processing and recognizing method. The present three-dimensional data processing and recognizing method is also applicable to a nuclear magnetic resonance system or the like, so as to recognize an interested target.

The present general concept is to perform searching, extraction, merger, statistical analysis and/or shape recognition on the three-dimensional data obtained by scanning and re-constructing of a security inspection CT system by means of using feature data of one or more interested targets or suspected targets, for example, dangerous articles or prohibited articles. Taking into consideration the shortcomings of schemes in the prior art, that image segmentation of three-dimensional data is still relatively difficult and the accuracy and universality is not so good, and so on, an embodiment of the present invention proposes the present three-dimensional data processing and recognizing method from a different viewpoint thereto. Further, an embodiment of the present invention solves technical problems of searching, statistics and shape recognition with respect to one or more interested targets.

The present three-dimensional data processing and recognizing method will be described in detail below with reference to FIGS. 1-5 in combination with the following examples.

An embodiment of the present invention mainly applies to recognition of dangerous articles such as a cone or an approximate cone, for example, sharp, pointed, or arrowed dangerous articles or spike-like murder weapons. In addition, the present recognizing method is also applicable to cylinder-shaped articles, such as guns or the like.

At first, in order to better explain the present three-dimensional processing and recognizing method, some properties of the cone or cylinder are described below in detail.

Referring to FIG. 1, in the following, a cone is taken as one example, but it should be understood that a cylinder also has similar properties. Therefore, the present three-dimensional data processing and recognizing method can be used to recognize a cone and/or a cylinder.

As shown in FIG. 1, a cone is cut through an axis AG thereof to obtain a plane π (specifically, shown as a triangle ABC). The plane π is intersected with a cross section of the cone and the intersection line is labelled as EF. The intersection line EF is perpendicular to the axis AG, i.e., EF⊥AG. The plane π is intersected with an inclined cross section of the cone, at an intersection line labelled as JK. It is assumed that a line LM is parallel to the line JK, i.e., LM$_∥$JK. A point P is a midpoint of the line segment JK, and the line AP is intersected with the line LM at a point Q. In accordance with properties of similar triangles, it is known that the point Q is a midpoint of the line segment LM. Since ∠APK<∠ADK and ∠ADK<∠ADF, it can be derived: ∠APK<∠ADF, i.e., ∠APK<90°. Therefore, an embodiment of the present invention adopts such a property of the cone as a judgement basis to recognize its cross section. Specifically, the present three-dimensional data processing and recognizing method is illustrated as follows.

The present three-dimensional data processing and recognizing method mainly includes two parts: data processing and recognition in terms of shape and size of the cone/cylinder.

Data Processing

At first, the security inspection CT system scans the object to be detected and re-constructs it to obtain CT image data (i.e., three-dimensional data). And then, one or more prohibited articles (such as a cutting tool) may be recognized based on the obtained three-dimensional data.

By using feature/characterizing data of a prohibited article, the obtained three-dimensional data is searched and merged and three-dimensional data matching to such feature data is extracted, thereby an interested target is produced or constituted by the extracted three-dimensional data. The prohibited articles can be common dangerous goods, such as cutting tools, explosives, guns and the like. The feature data can be data about one or more composition materials of the common dangerous articles, for example, iron, copper, or heavy metals. Such data can be any one of attenuation coefficient data, density data, atomic number data (or energy spectrum data of energy spectrum CT), and/or any combination thereof. Typically or preferably, the data can be density data and/or the atomic number data.

Among the matched three-dimensional data, adjacent data points are merged and classified as one group. Images of these merged three-dimensional data can be displayed individually or highlighted, for an inspector's inspection.

A number of data points among the merged three-dimensional data can be counted to estimate a dimension of a prohibited article. Of course, it is possible at this time to make statistics on mass, position, density and/or atomic number where the merged three-dimensional data is located, to respectively derive mean values thereof, so that more specific information on position, volume, mass, and/or material species of the interested target located in the articles to be inspected can be obtained. These would help to further recognize prohibited articles. It should be understood that whether the articles to be detected or inspected are drugs or explosives, they can be recognized based on their density and atomic number.

It should be noted that an interested target formed by the extracted three-dimensional data or an interested target formed by the merged three-dimensional data can be used to perform the step of constructing surface data from the three-dimensional data, before a step of recognizing shape and size.

Constructing Surface Data from the Three-Dimensional Data

Taking an interested target formed by the merged three-dimensional data as an example, the step of "constructing surface data from the three-dimensional data" is described in detail. It should be understood that the step of "constructing surface data from the three-dimensional data" can also be performed on basis of an interested target formed by the extracted three-dimensional data.

Specifically, the merged three-dimensional data constitutes or makes up a three-dimensional target (i.e., an interested target). Firstly, one point I is selected within the interested target. Desirably, a method of selecting the point I includes: selecting a maximal value and a minimal value of the data within the merged three-dimensional data in directions of the x, y, z axes of a rectangular coordinate system (herein, the direction of the x, y, z axes of the rectangular coordinate system can be arbitrarily selected, as long as any two of the three directions are perpendicular to each other, similarly hereinafter); and respectively calculating median of the maximal value and the minimal value in the above described three directions, wherein coordinates of the median can be selected as coordinates of the selected point I.

It is further noted that with respect to some interested targets having abnormal shapes, after finding out the point I, it is possible to check whether the point I has adjacent data in three dimensional directions (i.e., the three-dimensional data of the interested target in forward, backward, left, right, upward, downward directions thereof). If not, it is necessary to again find one point near the point I as a new point I, which can satisfy the above condition. As such, it can be sure that the point I will always fall within the interested target regardless of its shape.

A spherical coordinate system is established with the point I as the origin of the coordinates. In the spherical coordinate system, an angle (θ, φ) of each point among the merged solid data (the three-dimensional data) and a distance thereof from the point I are calculated, wherein 0≤θ≤π, 0≤φ<2π (in a physical sense, θ is a zenith angle, and φ is an azimuthal angle). Δθ and sinθΔφ are set and a point within each solid angle sinθΔφΔθ, which is farthest away from the point I, is selected as one of surface data.

In an embodiment, some data out of the surface can be eliminated. One means is to obtain an interpolation point of each surface datum (corresponding to each data point) as described above, which is obtained by interpolating surrounding points of the selected point. If a distance of the interpolation point from the point I is larger than a distance of the selected point from the point I, then the selected point which has been considered as a surface data point will be eliminated. Specifically with reference to FIG. 2 (showing four points A, B, C, and D), since the distance of the interpolation point of the point B derived by linear interpolation of points A and C from the point I is larger than the distance of point B from the point I, the point B is eliminated. After the above eliminating process, the remaining data can be considered as more reliable surface data.

Of course, for some three-dimensional targets or interested targets having hollow cavity structures, there is not only concern for outer surface data of such three-dimensional targets, but also concern for inner surface data thereof. In a manner similar to the above described, when selecting the inner surface data, the point closest to the point I is chosen within each solid angle $\sin\theta\Delta\phi\Delta\theta$ as the inner surface data. Similarly, in the step of eliminating the inner surface data, if the obtained interpolation point of the selected point is closer to the point I than the selected point, then the selected point is eliminated.

In addition, another method to eliminate the data is described as follows. If a ratio of a distance of the interpolation point of the selected point (for example, obtained with respect to the selected point) from the point I to a distance of the selected point from the point I falls within a predetermined range of threshold (taking as an example, [0.95, 1.05]), then the selected point should be kept; otherwise, the selected point should be eliminated. Such method can also be applicable to eliminating of the above described surface data and inner surface data.

At this time, the constructed surface data can be shown to the operator, so as to intuitively and clearly observe the shape of the interested target and perform an initial recognition (for example, in terms of shape).

In order to accelerate the algorithm, in certain circumstances, for example an interested target having a very simple shape, it is possible to only construct surface data near the three coordinate axes x, y, and z, without constructing all the surface data of the interested target.

Another method to construct the surface data is: for an interested target, the three-dimensional data is analyzed; if there is additional data adjacent to it in all three dimensional directions (for example, the upward and downward direction, the left and right direction, and the fore-and-aft direction), then the three-dimensional data can be deemed to be non-surface data; in contrast, the remaining three-dimensional data shall be surface data.

Recognition in Shape and Size of the Cone/Cylinder

For an interested target to be recognized as a cone/cylinder, not only can the interested target be formed by the three-dimensional data (i.e., the merged three-dimensional data) obtained in the step of "data processing", the interested target can also be formed by the three-dimensional data obtained in the step of "constructing surface data".

In the present embodiment, as an example, the recognition and processing are performed on the interested target formed after the step of "constructing surface data from three-dimensional data". It should be understood that the interested target in the latter case contains less redundant data, and thus is easy to be processed, because some data points out of the surface have been eliminated.

Firstly, a point I is arbitrarily selected inside the interested target. It is desirable to select the coordinate $(x_0, y_0, z_0)$ of a median of a maximal value and a minimal value of the three-dimensional data in a direction of the respective three x, y, and z coordinate axes as the coordinate of the point I.

Figure 3:
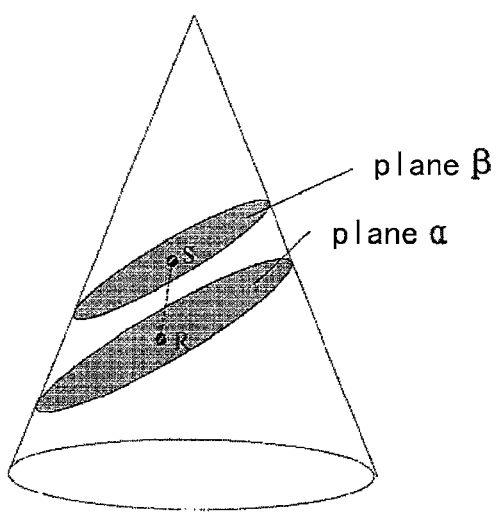
FIG. 3 is a schematic view showing a cross section passing through an origin of coordinate selected in the interested target and another cross section parallel therewith.

Referring to FIG. 3, a method of recognizing a cross section of the interested target includes the following steps of:

1) A plane a passing through the point I within the interested target (supposing a normal direction thereof in a spherical coordinate direction $(\theta, \phi)$) is arbitrarily selected to cut the interested target, so that intersection points of the plane $\alpha$ with the interested target are obtained. These intersection points are analyzed to obtain a central point R thereof;

2) A point is selected out of the plane a and adjacent to the point I, and a plane $\beta$ is drawn parallel to the plane $\alpha$. Thereafter, the interested target is cut by the plane $\beta$, so that intersection points of the plane $\beta$ with the interested target are obtained. These intersection points are analyzed to obtain a central point S thereof;

3) If a line RS is perpendicular to the plane $\alpha$, i.e., RS$\perp$ plane $\alpha$, then the plane $\alpha$ is the cross section. Otherwise, the line RS is not perpendicular to the plane $\alpha$, and then the normal direction $(\theta, \phi)$ of the plane $\alpha$ passing through the point I is transformed to find out a new plane, in order to cut the interested target again. The steps 1)-3) are repeated, until the condition of RS$\perp$ plane $\alpha$ is approximately satisfied.

Understandably, when performing the above described method of recognizing the cross section of the interested target, if the method is very time-consuming, it is possible to search the cross section by a strategy of firstly making a coarse searching and then making a fine searching. Of course, some known information can be used to guide the searching so as to expedite searching speed.

One solving method to find out the above described central point R or S is as follows. Coordinate values of a midpoint with respect to n points, are $$\overline{X} = \frac{\sum X_i}{n}, \overline{Y} = \frac{\sum Y_i}{n}, \overline{Z} = \frac{\sum Z_i}{n},$$

wherein $X_i, Y_i, Z_i$ are respectively coordinate values of the ith point on x, y, z coordinate axes, $1 \leq i \leq n$, n is an integer.

When the object to be detected has a shape like a cylinder, cone or truncated cone, the following quick recognizing method can be used to search the cross section (of course, the above method is still applicable, but its calculating speed may be relatively slow).

A plane $\alpha$ passing through the point I within the interested target (supposing its normal direction being a spherical coordinate direction $(\theta, \phi)$) is used to cut the interested target. If the cut graph is a circle, then the plane $\alpha$ is the cross section. If not, the normal direction $(\theta, \phi)$ of the plane $\alpha$ (passing through the point I) is transformed to find out a new plane considered as the cross section, which is used to cut the interested target again. This step is repeated until the cut graph is a circle (i.e., obtaining the cross section), or if the normal direction $(\theta, \phi)$ goes through all the possible directions, the step will stop.

Figure 4:
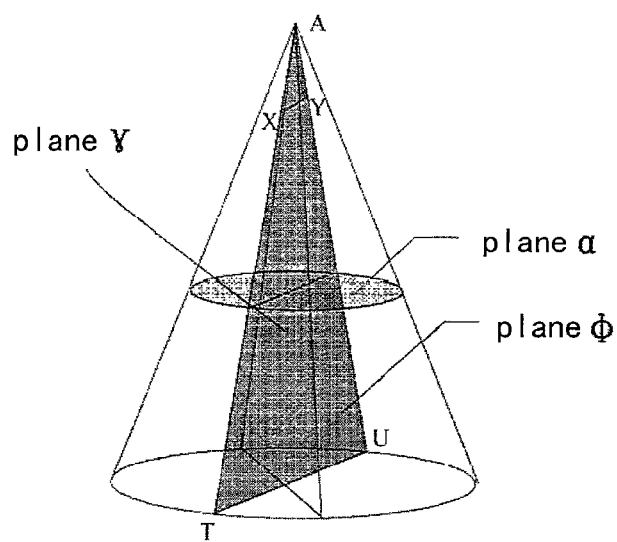
FIG. 4 is a schematic view showing two perpendicular planes passing through the central point of the cross section after recognizing a cross section of the interested target.

After the above searching step, the cross section $\alpha$ of the interested target is found out. Referring to FIG. 4, two planes $\Phi$ and Y perpendicular to the cross section $\alpha$ are made, which pass through the central point of the cross section $\alpha$. In addition, the two planes $\Phi$ and Y are perpendicular to each other. For the sake of saving calculation time, it is also possible to only draw one such plane perpendicular to the cross section $\alpha$.

If the graph obtained by cutting the interested target by the perpendicular planes $\Phi$ and Y, is a triangle, then the interested target is determined to be a cone. A point angle of the cone is a vertex angle of the triangle.

In a case that the graph obtained through cutting the interested target by the perpendicular planes $\phi$ and Y, is a trapezium, and a line segment TU (consisting of two of four end points X, Y, U and T of the trapezium, as shown in FIG. 3) is larger than or equal to a line segment XY (consisting of the other two of four end points X, Y, U and T of the trapezium), i.e., the line segment TUθthe line segment XY, a ratio {(TU−XY)/(TU+XY)} of a difference of lengths of the line segments TU and XY to a summation of lengths of the line segments TU and XY is calculated. If the ratio is larger than a threshold (for example, 0.1), then the interested target is determined to be a cone; otherwise if the ratio is less than the threshold, then the interested target is determined to be a cylinder. Herein, the end points X and Y are upper end points of the trapezium, and the end points U and T are lower end points of the trapezium.

In practice the cone often has a shape of a truncated cone or a frustum of pyramid, due to the manufacturing or wear. Therefore, the graph obtained by cutting the truncated cone or the frustum of pyramid by the perpendicular plane φ or Y, typically is a trapezium. As shown in the upper part of the FIG. 4, the graph obtained through cutting the interested target by the perpendicular plane φ is a trapezium XYTU or a triangle ATU. Thus, a length of the line segment XY is calculated as dimension of a conical tip of the cone. An intersection angle between the line segment XT and the line segment YU is calculated as a point angle of the cone.

In an embodiment, such a point angle can be obtained by a formula of $2\sin^{-1}(TU-XY)/2XT$. Of course, alternatively, it is possible to use other methods known in the art to calculate the point angle.

If the dimension of the conical tip is less than a threshold (for example, 8 mm) and the point angle is less than another threshold (for example, 90°), then the system will be informed to make an alert. Likewise, the dimension of the conical tip and the point angle of the graph which are obtained by cutting the interested target by the perpendicular plane Y can be calculated. And further, an alert is made in accordance with the same threshold.

If features in terms of material (for example, copper), dimension of the conical tip and the point angle conform to that of a bullet, then the interested target can be determined as the bullet.

Figure 5:
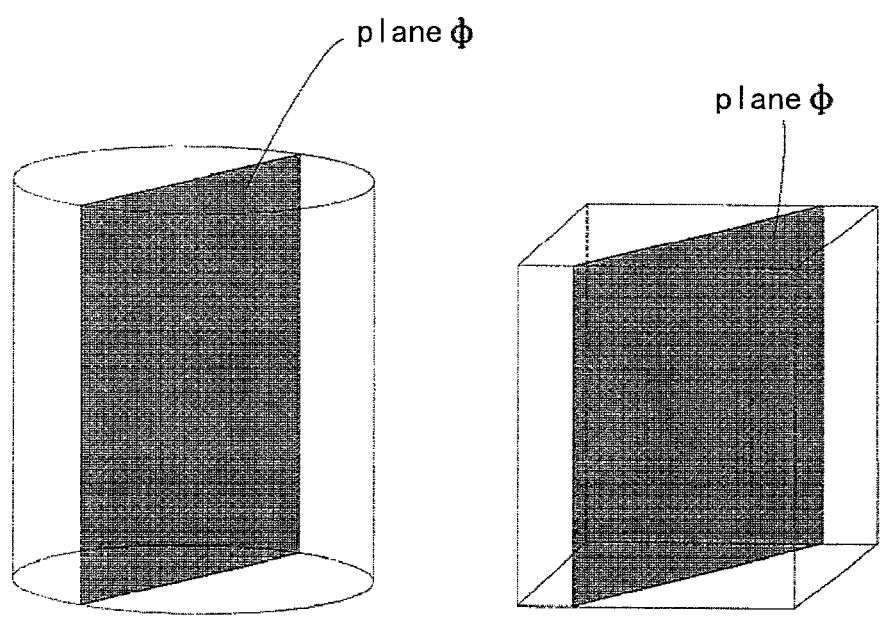
FIG. 5 is a schematic view respectively showing a graph obtained by using a plane perpendicular to the cross section to cut an interested target having a shape of a cylinder and a cube.

If the graph obtained by cutting the interested target by the perpendicular planes φ and Y is rectangular, then the interested target is determined as a cylinder. The dimension of the cylinder can be calculated from length and width of the rectangular, as shown in FIG. 5. FIG. 5 shows that the graph obtained by cutting an interested target can be a rectangular, when the interested target having a shape of a cylinder or a cube is cut by the perpendicular plane φ.

If the plane φ and the plane Y are perpendicular to each other, the two obtained graphs cutting through the interested target by them are rectangular having an equal size, and if the cross section of the interested target is of a circle, then the interested target is recognized as a cylinder.

If the cylinder is recognized to be hollow, then the interested target is determined to be tube-shaped.

If the tube-shaped target has an inner diameter in a range of an inner diameter of a gun barrel, and the tube-shaped target is of metal material (such as copper or iron), then the interested target is determined to be a gun.

If the graphs obtained by the perpendicular planes φ and Y and the cross section of the interested target all are rectangular, then the interested target is determined to be a cuboid.

After the interested target is recognized as a cone or an approximate cone, in accordance with the dimension and the point angle of the cone and the metal material thereof (or high density material), the present method can also recognize the object as, for example, an arrow, a pointed knife, a screwdriver, a cannonball, a missile warhead or the like. In the security inspection, the cone or arrow of glass material is also a potential dangerous article. A needle-shaped object or the like can be recognized in a high-precision image.

In addition, after an interested target is recognized as a tube-shaped object, if the material thereof is of metal and the size thereof meets the corresponding requirements, then it is determined to be a missile body or a cannonball body. And further, if a filling material contained therein or disposed adjacent thereto conforms to features of ammunition (for example, density or atomic number), a presence of a high dangerous missile or cannonball body can be accurately determined.

Based on the recognition of the cylinder, an intelligent inspection can be performed, so as to effectively prevent very common prohibited carrying articles such as a long stick and a crutch during aviation security. The working intensity of the inspector is decreased.

The present method herein is applicable to systems for generating three-dimensional data, such as CT and nuclear magnetic resonance systems. In an embodiment of the present invention, a rectangular coordinate system and a spherical coordinate system are used to explain the method, but usage of other coordinate systems or a simple extension of an embodiment of the present invention all fall within the scope of the present invention.

Concerning the above, an embodiment of the present invention extracts three-dimensional data by matching features, and recognizes a cross section of an interested target; cuts the interested target by at least one perpendicular plane which passes through a central point of the cross section and is perpendicular to it, in order to obtain a graph; and recognizes a shape of the interested target based on a property of the graph, so that a prohibited article such as a spike-shaped object or a gun can be recognized. Various CT systems can employ the present method to recognize dangerous articles. Other systems generating three-dimensional data, such as nuclear magnetic resonance system or the like can introduce this method to recognize the interested target. That is, the three-dimensional data obtained by scanning and re-constructing of the security inspection CT system are searched, extracted, merged, counted and recognized in terms of shape, by feature data of interested targets. As image segmentation of three-dimensional data in the prior art is still relatively difficult up to now, and accuracy and generality thereof are not so good, starting from another viewpoint an embodiment of the present invention provides the present three-dimensional data processing and recognizing method solves the problems of searching, making statistics and recognizing in terms of shape for interested targets.

It should be noted that an embodiment of the present invention is applicable to systems generating three-dimensional data such as CT and nuclear magnetic resonance system, and so on. Although in an embodiment of the present invention, a rectangular coordinate system and a spherical coordinate system are taken as examples to describe the three-dimensional data processing and recognizing method, it should be understood that using other coordinate systems based on an embodiment the present invention or simple development of an embodiment of the present invention all fall within the scope of the present invention.

Although some embodiments of the general inventive concept are illustrated and explained, it would be appreciated by those skilled in the art that modifications and variations may be made in these embodiments without departing from the principles and spirit of the general inventive concept of the disclosure, the scope of which is defined in the appended claims and their equivalents.

What is claimed is:

1. A three-dimensional data processing and recognizing method, the method comprising:
   scanning and re-constructing an object to be detected so as to obtain three-dimensional data for recognition of the object to be detected;
   extracting data matching to features from the three-dimensional data, so that the extracted data constitutes an interested target;
   with respect to the data matching to features, merging and classifying adjacent data points as one group, to form an image of the merged interested target;
   recognizing a cross section of the interested target;
   cutting the interested target by a perpendicular plane which passes through a central point of the cross section and is perpendicular to the cross section, in order to obtain a graph; and
   recognizing a shape of the interested target based on a property of the graph.

2. The three-dimensional data processing and recognizing method of claim 1, wherein in analyzing each three-dimensional data point of the interested target, if the three-dimensional data point has other adjacent three-dimensional data points in three-dimensional directions, then it will be deemed as non-surface data; otherwise, if not, it will be deemed as surface data.

3. The three-dimensional data processing and recognizing method of claim 1, wherein the interested target has surface data, which is obtained by an analyzing method of spatial angle distribution, the analyzing method of spatial angle distribution comprising:
   selecting an arbitrary point I within the interested target as an origin of a coordinate system, and then establishing a corresponding spherical coordinate system;
   calculating a zenith angle $\theta$ and an azimuthal angle $\phi$ of each point in the three-dimensional data as well as a distance of the point from the origin of coordinate I under the spherical coordinates; and
   setting up $\Delta\theta$ and $\sin\theta\Delta\phi$, and selecting a point having a farthest distance from the origin within each solid angle $\sin\theta\Delta\phi\Delta\theta$ as a surface datum;
   wherein a median of a maximal value and a minimal value of the three-dimensional data in directions of the x, y and z coordinate axes is chosen as the coordinate of the arbitrary point I or one point within the interested target.

4. The three-dimensional data processing and recognizing method of claim 3, wherein:
   with respect to each surface data point obtained thereby, an interpolation point of the selected point is obtained by an interpolating calculation of its surrounding surface data points and if a distance of the interpolation point from the point I is larger than a distance of the selected point from the point I, then the selected point is eliminated, or
   with respect to each surface data point obtained thereby, an interpolation point of the selected point is obtained by an interpolating calculation of its surrounding surface data points and if a ratio of a distance of the interpolation point from the point I to a distance of the selected surface data point from the point I falls within a predetermined range, then the selected surface data point is kept; otherwise, the selected surface data point is deleted.

5. The three-dimensional data processing and recognizing method of claim 3, wherein:
   in a circumstance of the interested target having a hollow structure, inner surface data of the interested target is recognized by the analyzing method of spatial angle distribution, a point having a closest distance from the origin within each solid angle $\sin\theta\Delta\phi\Delta\theta$ is selected as one of the inner surface data;
   with respect to each inner surface data point obtained thereby, an interpolation point of the selected point is obtained by an interpolating calculation of its surrounding surface data points and if a distance of the interpolation point from the point I is less than a distance of the selected point from the point I, then the selected surface data point is deleted.

6. The three-dimensional data processing and recognizing method of claim 1, wherein recognizing the cross section of the interested target comprises:
   1) a plane $\alpha$ passing through a point I or the point I arbitrarily selected within the interested target is arbitrarily selected to cut the interested target, so that intersection points of the plane $\alpha$ with the interested target are obtained, and these intersection points are analyzed to obtain a central point R thereof;
   2) one point is selected out of the plane $\alpha$ and adjacent to the point I, a plane $\beta$ is drawn in parallel to the plane $\alpha$, after which, the interested target is cut by the plane $\beta$, so that intersection points of the plane $\beta$ with the interested target are obtained, and these intersection points are analyzed to obtain a central point S thereof; and
   3) if a line RS is perpendicular to the plane $\alpha$, then the plane $\alpha$ is the cross section, or otherwise, if the line RS is not perpendicular to the plane $\alpha$, then the normal direction of the plane $\alpha$ is transformed to find out a new plane, in order to cut the interested target again; and then the steps 1)-3) are repeated, until the condition that the line RS is perpendicular to the plane $\alpha$ is satisfied,
   wherein the above described central point R or S is solved by the following:
   coordinate values of a midpoint with respect to n points, are $$\overline{X} = \frac{\sum X_i}{n}, \overline{Y} = \frac{\sum Y_i}{n}, \overline{Z} = \frac{\sum Z_i}{n},$$

wherein $X_i$, $Y_i$, $Z_i$ are respectively coordinate values of the ith point on x, y, z coordinate axes, $1 \le i \le n$, n is an integer.

7. The three-dimensional data processing and recognizing method of claim 1, wherein:
   if the graph obtained by cutting the interested target by the perpendicular plane, is a triangle, then the interested target is determined to be a cone;
   in a case that the graph obtained by cutting the interested target by the perpendicular plane is a trapezium wherein end points X and Y are upper end points of the trapezium, and end points U and T are lower end points of the trapezium, and a line segment TU$\ge$a line segment XY,
   a ratio $\{(TU-XY)/(TU+XY)\}$ of a difference of lengths of the line segments TU and XY to a summation of lengths of the line segments TU and XY is calculated, and
   if the ratio is larger than a predetermined threshold, then the interested target is determined to be a cone, further if the interested target is determined to be a cone, a length of the line segment XY is calculated as dimension of a conical tip of the cone, and a point angle of the cone is calculated as $2\sin^{-1}((TU-XY)/2XT)$; and otherwise if the ratio is less than the predetermined threshold, then the interested target is determined to be a cylinder.

8. The three-dimensional data processing and recognizing method of claim 7, wherein after the interested target is recognized as a cone or an approximate cone, in accordance with a dimension and a point angle of the cone and if its material is metal or high density material, the interested target is further recognized as an arrow, a pointed knife, a screwdriver, a cannonball, or a missile warhead.

9. The three-dimensional data processing and recognizing method of claim 1, wherein, if the graph obtained by cutting the interested target is a rectangle, then the interested target is determined as a cylinder and a dimension of the cylinder is calculated from a length and width of the rectangle.

10. The three-dimensional data processing and recognizing method of claim 9, wherein, if two perpendicular planes $\Phi$ and $Y$ of the interested target are perpendicular to each other, the two obtained graphs by means of cutting the interested target by them are rectangles having an equal size, and the cross section a of the interested target is a circle, then the interested target is recognized as a cylinder and, if the cylinder is recognized to be hollow, then the interested target is determined to be tube-shaped.

11. The three-dimensional data processing and recognizing method of claim 10, wherein, if the tube-shaped target has an inner diameter in a range of an inner diameter of a gun barrel and the tube-shaped target is of metal material, then the interested target is determined to be a gun.

12. The three-dimensional data processing and recognizing method of claim 1, wherein, if the image of the object to be detected is substantially of a cylinder, cone or truncated cone, the following quick recognizing method is used to recognize the cross section thereof:

a plane $\alpha$ passing through a point I or the point I within the interested target is used to cut the interested target, and it is supposed that its normal direction is a spherical coordinate direction $(\theta, \phi)$;

if the graph cut by the plane $\alpha$ is of a circle, then the plane $\alpha$ is the cross section; or otherwise, if not, the normal direction $(\theta, \phi)$ of the plane $\alpha$ passing through the point I is transformed to find out a new plane and replace the plane $\alpha$ by it, which is used to cut the interested target again;

the above step is repeated until the cut graph is of a circle or if the normal direction $(\theta, \phi)$ has gone through all the possible directions, the step will stop.

13. The three-dimensional data processing and recognizing method of claim 1, wherein the data matching to features is obtained by searching the three-dimensional data in conformity with existing data of common dangerous articles or prohibited articles and the existing data is any selected from: attenuation coefficient data, density data, atomic number data or a combination selected therefrom.

14. The three-dimensional data processing and recognizing method of claim 1, wherein, with respect to the merged data, a number of data points therein is used to estimate a size of the object to be detected, and an average value is obtained by a statistic of any selected from: position, mass, attenuation coefficient, density, atomic number, or any combination selected therefrom, of an area in which the merged data is located.

15. The three-dimensional data processing and recognizing method of claim 1, wherein the three-dimensional data is obtained by scanning and re-constructing the object to be detected by a security inspection CT system or a nuclear magnetic resonance system.

* * * * *